United States Patent [19]

Inaishi et al.

[11] Patent Number: 5,113,471
[45] Date of Patent: May 12, 1992

[54] OPTICAL WAVEGUIDE ARRAY AND METHOD OF MANUFACTURING SAME

[75] Inventors: Kouji Inaishi, Okazaki; Chisato Yoshimura, Nagoya; Yuji Shinkai, Handa, all of Japan

[73] Assignee: Brother Kogyo Kabushiki Kaisha, Nagoya, Japan

[21] Appl. No.: 680,754

[22] Filed: Apr. 5, 1991

[30] Foreign Application Priority Data

Aug. 28, 1990 [JP] Japan ................ 2-225978

[51] Int. Cl.$^5$ ............................................. G02B 5/14
[52] U.S. Cl. ........................................ 385/126; 385/49
[58] Field of Search ................ 350/96.17, 96.30-96.33

[56] References Cited

U.S. PATENT DOCUMENTS

| | | | |
|---|---|---|---|
| 3,899,235 | 8/1975 | Arnaud et al. | 350/96.17 X |
| 4,877,306 | 10/1989 | Kar | 350/96.33 |
| 4,979,798 | 12/1990 | Lagakos et al. | 350/96.33 |

FOREIGN PATENT DOCUMENTS

| | | |
|---|---|---|
| 48-5976 | 2/1973 | Japan . |
| 52-2629 | 1/1977 | Japan . |
| 62-69207 | 3/1987 | Japan . |
| 62-69208 | 3/1987 | Japan . |

*Primary Examiner*—Akm E. Ullah
*Attorney, Agent, or Firm*—Oliff & Berridge

[57] ABSTRACT

In the optical waveguide array according to the present invention, a clad portion and cores formed by curing photocurable resins are sandwiched between two reinforcing members, at least one of which has a light transmitting characteristic. The clad portion covers the cores. The method of manufacturing the optical waveguide array according to the present invention comprises applying a first photocurable resin to a mold having an optical waveguide pattern of the optical waveguide array; placing a first reinforcing member having a light transmitting characteristic closely on the upper surface of the photocurable resin and then radiating light from above the first reinforcing member to form a clad layer having grooves corresponding to the optical waveguide pattern, the clad layer being bonded firmly to the first reinforcing member; pouring a second photocurable resin, having a refractive index higher than that of the first photocurable resin, into the grooves of the clad layer; radiating light from above the first reinforcing member to cure the second photocurable resin to thereby form cores; applying a third photocurable resin, having a refractive index lower than that of the second photocurable resin, onto the core-formed surface of the clad layer and then placing a second reinforcing member on the third photocurable resin; and radiating light from above the first reinforcing member to cure the third photocurable resin applied to the core-formed surface of the clad layer to thereby form a photocured resin layer and bonding the second reinforcing member firmly to the photocured resin layer. Alternatively, if the second reinforcing member is also has a light transmitting characteristic, light can be radiated through the second reinforcing member to cure the third photocurable resin.

19 Claims, 5 Drawing Sheets

OPTICAL WAVEGUIDE ARRAY AND METHOD OF MANUFACTURING SAME

BACKGROUND OF THE INVENTION

1. Field of the Invention

The present invention relates to an optical waveguide array for the optical transmission of a signal or energy.

2. Description of Related Art

Known methods for manufacturing an optical waveguide array include a first method disclosed in Japanese Patent Publication No. 2629/77 and Patent Laid Open Nos. 69207/87 and 69208/87, which consists of bonding a reinforcing plate to an optical waveguide array body comprising cores and a clad layer and a second method wherein a large number of optical waveguides which have been formed in advance are arranged on a reinforcing plate, followed by adhesive bonding to complete an optical waveguide array, as disclosed in Japanese Patent Publication No. 5976/73.

However, in these known optical waveguide array manufacturing methods it is required to first form an optical waveguide array and thereafter bond a reinforcing material to the array. Thus, these methods require an additional bonding step and so are complicated. Also in the latter optical waveguide array manufacturing method, the need to arrange a large number of optical waveguides is very troublesome.

To avoid such complicated and troublesome steps, there sometimes is adopted a method generally called a 2P method to produce an optical waveguide array. According to the 2P method, clads and cores of optical waveguides are formed using a photocurable resin, then a reinforcing plate is brought into close contact with the photocurable resin which forms the clads, followed by light irradiation, to form an optical waveguide array.

However, the resins commonly used as materials for such a reinforcing plate, e.g., acrylic resins, polycarbonate resins and polystyrene resins, do not easily transmit a light of the wavelength necessary for the curing a photocurable resin. Consequently, the curing efficiency of the photocurable resin which forms clads and cores is low and the reinforcing plate is not strongly bonded to the optical waveguides resulting in a optical waveguide array of low reliability in both performance and quality. The manufacturing efficiency and yield are also low.

SUMMARY OF THE INVENTION

The present invention solves the above-mentioned problems and has as its objects to provide an optical waveguide array of high reliability in both performance and quality, and a method capable of manufacturing such arrays having high efficiency and high yields.

According to the present invention, in order to achieve the above objects, there is provided an optical waveguide array wherein a clad portion which covers the cores is sandwiched between two sheets of reinforcing members at least one of which has a light transmitting characteristic.

For achieving the afore-mentioned objects there also is provided according to the present invention an optical waveguide array manufacturing method comprising the steps of applying a first photocurable resin to a mold having an optical waveguide pattern for an optical waveguide array; contacting a first reinforcing member having a light transmitting characteristic closely with the upper surface of the photocurable resin and then radiating light from above the first reinforcing member to form a clad layer having grooves corresponding to the optical waveguide pattern and bonded firmly to the first reinforcing member; pouring a second photocurable resin, having a refractive index higher than that of the first photocurable resin, into the grooves of the clad layer; radiating light from above the first reinforcing member to cure the second photocurable resin to thereby form cores; applying a third photocurable resin, having a refractive index lower than that of the second photocurable resin, onto the core-formed surface of the clad layer and then contacting a second reinforcing member closely therewith; and radiating light from above the first reinforcing member to cure the third photocurable resin applied to the core-formed surface of the clad layer to thereby form a photocured resin layer and bonding the second reinforcing member firmly to the photocured resin layer.

In this optical waveguide array, since photocurable resins are used for the clad and core portions, the bonding between the reinforcing members and the clad portion is assured and strong.

In the optical waveguide array of the invention, moreover, at least one of the reinforcing members has a light transmitting characteristic and, because the clad and core portions formed by photocurable resins are sandwiched between the two reinforcing members, by radiating light from the light-transmissible reinforcing member side, an optical waveguide array can be formed efficiently.

BRIEF DESCRIPTION OF THE DRAWINGS

The above and other objects, features and advantages of the invention will become more apparent from reading the following description of the preferred embodiment taken in connection with the accompanying drawings, in which.

DETAILED DESCRIPTION OF THE PREFERRED EMBODIMENT

Referring to the accompanying drawings, a preferred embodiment of the invention will be described in detail.

Figure 8:
FIG. 8 is a sectional view of an optical waveguide array as completed by curing the photocurable resins through the reinforcing members.
Figure 7:
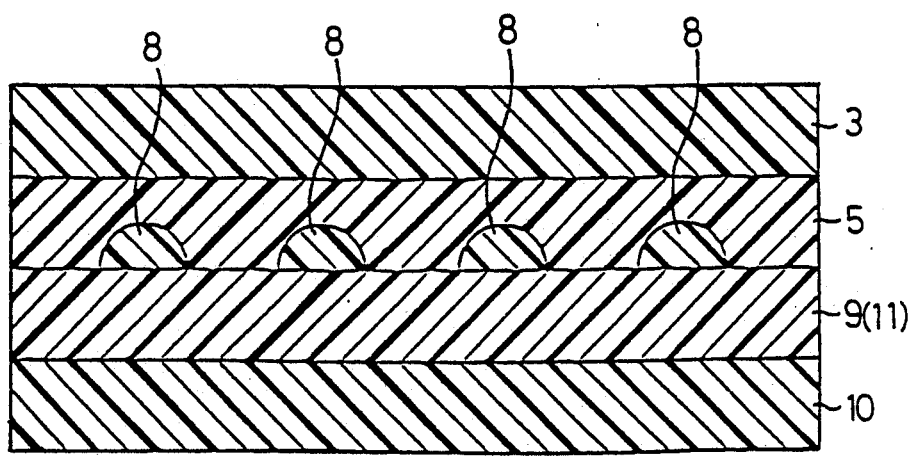

Referring first to FIG. 8, the structure of an optical waveguide array formed by the optical waveguide array manufacturing method of the present invention will be described. FIG. 8 is a sectional view of the completed optical waveguide array.

In this optical waveguide array, a clad layer 9 is laminated onto a reinforcing member 10, a clad layer 5 is further laminated onto the clad layer 9 with light transmitting cores 8 formed between clad layers 9 and 5, and a reinforcing member 3 having a light transmitting characteristic is formed on the clad layer 5. The light-transmissible reinforcing member 3 is a molded plate of TPX (polymethylpentene manufactured by Mitsui Petrochemical Industries, Ltd.) or another material having similar light transmission characteristics. The clad layers 5 and 9 have been formed by curing a photocurable resin through the irradiation of light, wherein the photocurable resin is a mixture comprising 10 parts by weight of Aronix M310 (6 mols-propylene oxide modified triacrylate of trimethylolpropane manufactured by TOAGOSEI CHEMICAL INDUSTRY CO., LTD.) and 1 part by weight of Irgacure 907 (2-methyl- [4-(methylthio)phenyl]-2-morpholino-1-propanone manufactured by CHIBA GEIGY Ltd.). The cores 8 have been formed by curing a photocurable resin through the irradiation of light, wherein the photocurable resin is a mixture comprising 10 parts by weight of Aronix M210 (4 mols-ethylene oxide modified diacrylate of bisphenol A manufactured by TOAGOSEI CHEMICAL INDUSTRY CO., LID.) and 1 part by weight of Irgacure 907. The reinforcing member 10 is a flat plate formed using a resin that does not easily transmit a light of the wavelength required for the curing of a photocurable resin such as an acrylic resin, a polycarbonate resin, or a polystyrene resin.

Referring now to FIGS. 1 to 8, the optical waveguide array manufacturing method of this embodiment will be described.

Figure 1:
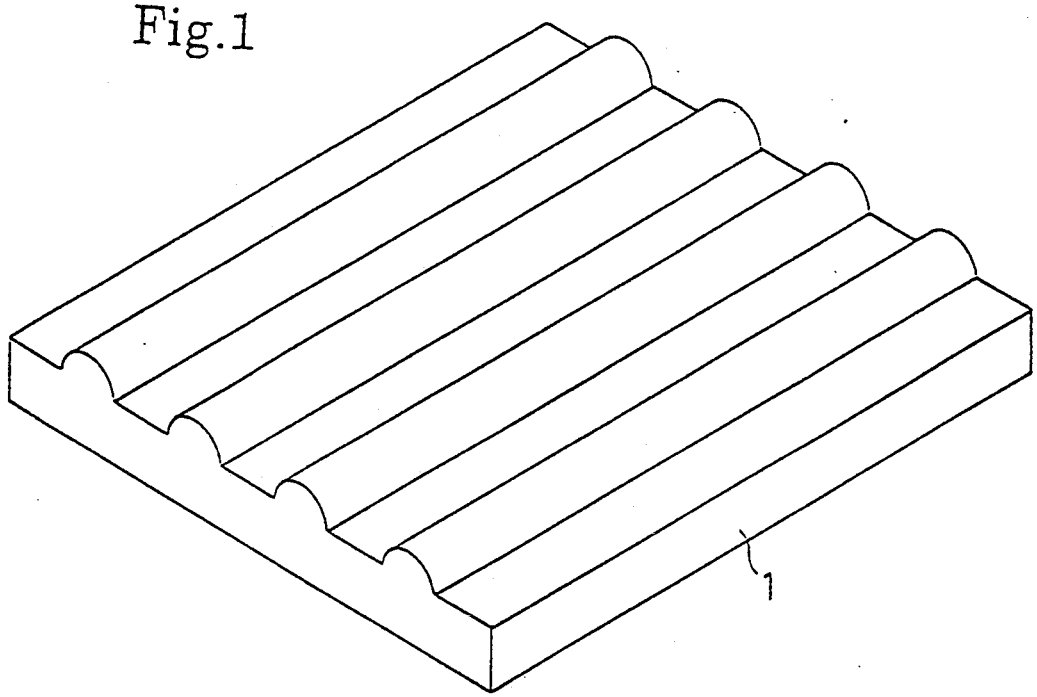
FIG. 1 is a perspective view of the base of a mold having an optical waveguide pattern.

First, a first photocurable resin 2, for the formation of a clad layer, is applied to a mold 1 having an optical waveguide pattern of an optical waveguide array (only the base having the optical waveguide pattern is shown in FIG. 1). The mold 1 is made of a material such as templating silicon, nickel-plated metal, and glass. The material of the mold 1 is not specially limited only requiring a superior capability in mold releasability and that it have a certain degree of strength. The first photocurable resin 2 is a mixture of 10 parts by weight of Aronix M310 and 1 part by weight of Irgacure 907 and is capable of being cured upon exposure to ultraviolet (UV) light.

Figure 2:
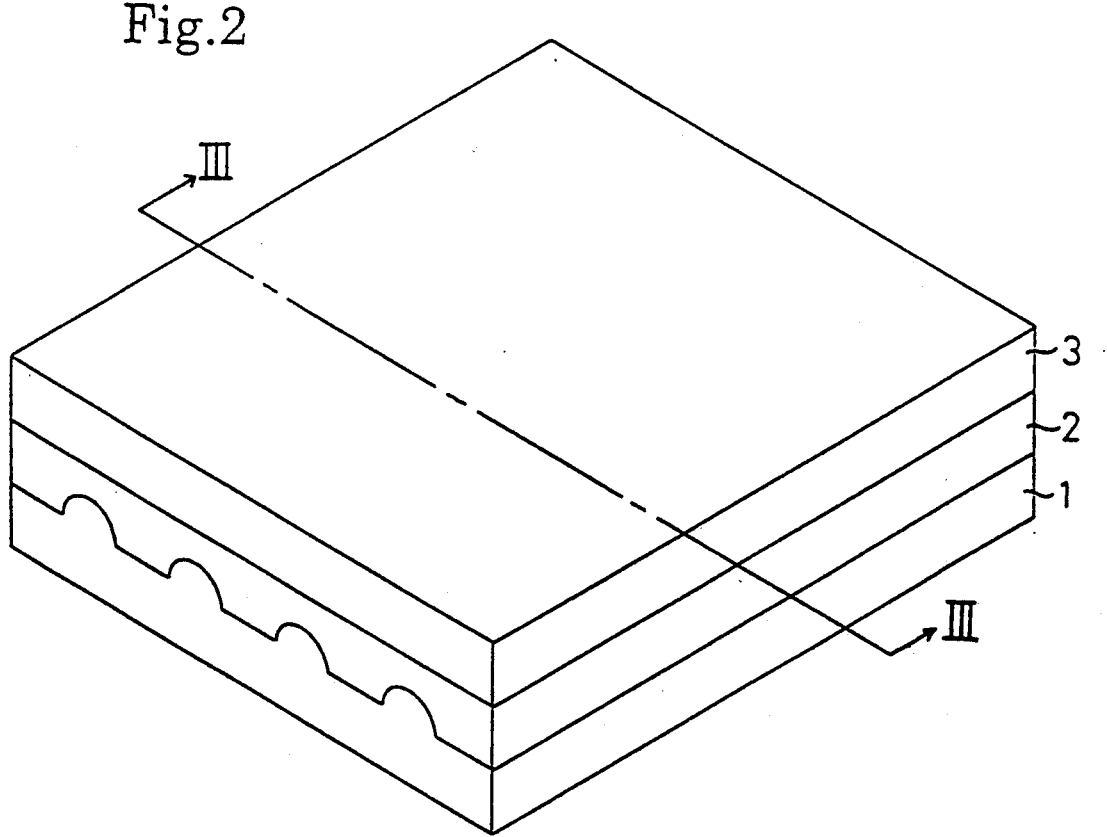
FIG. 2 is a perspective view showing the mold base, a photocurable resin layer formed thereon, and a reinforcing member contacted closely with the photocurable resin layer.
Figure 3:
FIG. 3 is a sectional view showing a state wherein light is radiated to the photocurable resin through the reinforcing member.
Figure 3:
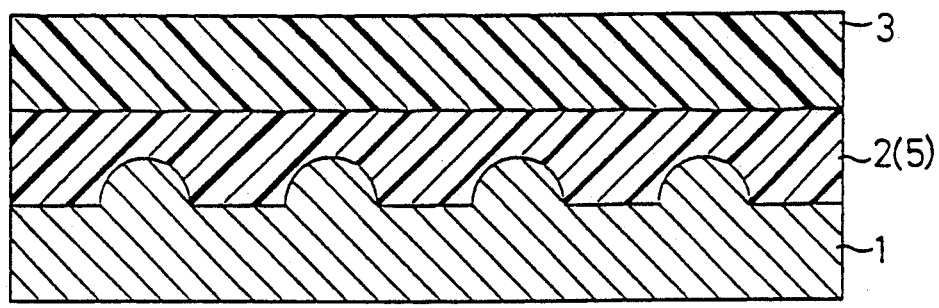
Figure 4:
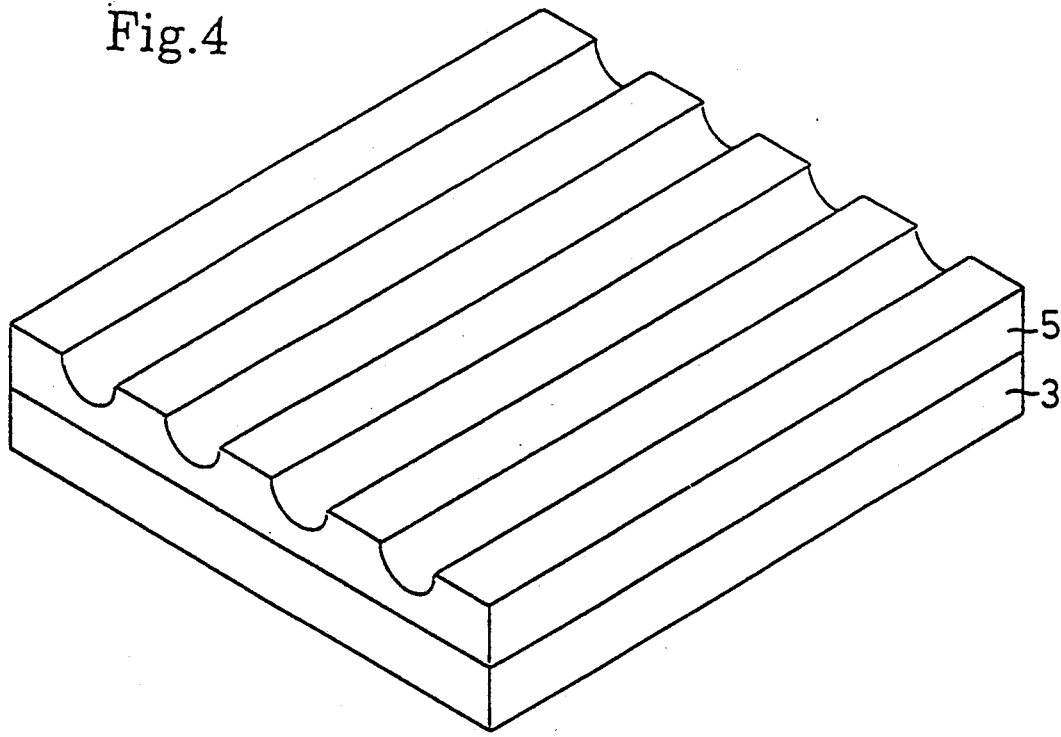
FIG. 4 is a perspective view showing a state wherein the photocurable resin has been cured into close contact with the reinforcing member and now serves as a clad layer having grooves corresponding to the optical waveguide pattern.

Next, as shown in FIG. 2, a first reinforcing member 3 having a light transmitting characteristic, is brought into close contact with a flat surface of the photocurable resin 2 formed in the mold 1. The reinforcing member 3 is a molded plate of TPX. Then, as shown in FIG. 3, a mercury vapor lamp 4 is disposed above the reinforcing member 3 and is turned ON to radiate UV light onto the reinforcing member 3. FIG. 3 is a sectional view taken on line III—III in FIG. 2. Since the reinforcing member 3 has a light transmitting characteristic, the UV light emitted from the mercury vapor lamp 4 passes through the reinforcing member 3 and is radiated to the photocurable resin 2, whereupon the first photocurable resin 2 cures to form a clad layer 5. Consequently, the reinforcing member 3 becomes adhered to the clad layer 5 and grooves corresponding to the waveguide pattern are set in the clad layer 5. Then, the clad layer 5, which is now adhered to the reinforcing member 3, is removed from the mold 1 to provide a laminate of clad layer 5 adhered to the reinforcing member 3 and having grooves corresponding to the waveguide pattern, as shown in FIG. 4.

Figure 5:
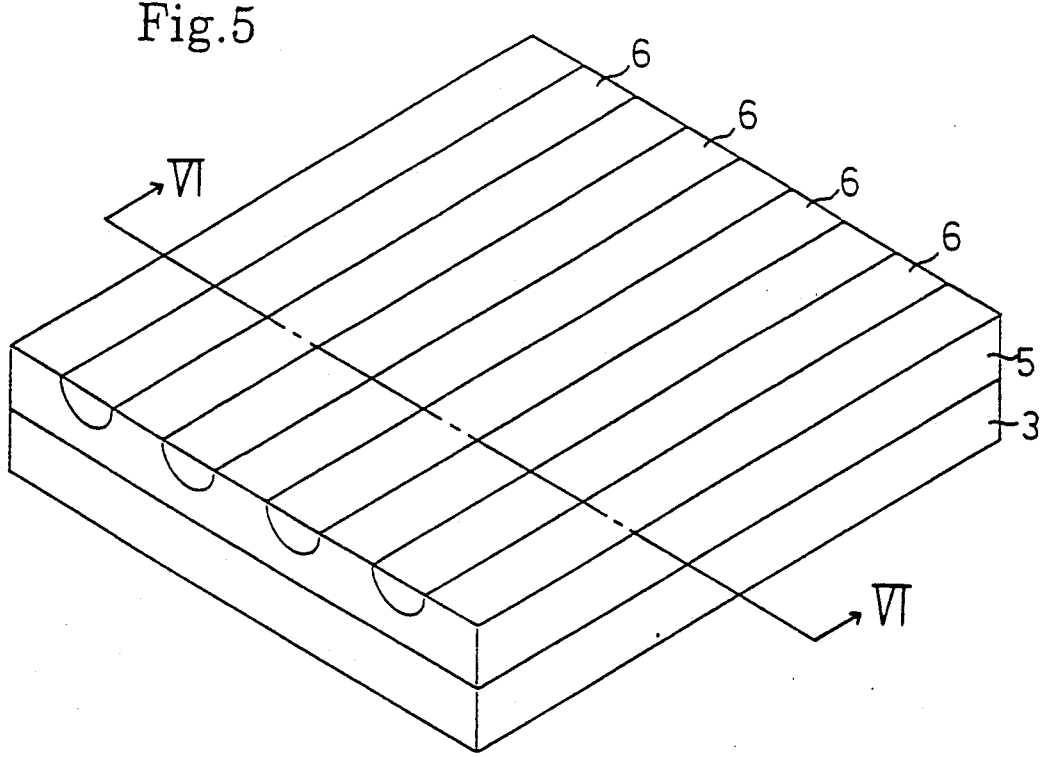
FIG. 5 is a perspective view showing a state wherein the grooves of the optical waveguide pattern in FIG. 4 have been filled with a photocurable resin.

Next, as shown in FIG. 5, a second photocurable resin 6 for forming cores, is placed in the grooves of the clad layer 5 by the use of capillary action. The second photocurable resin 6 is a mixture of 10 parts by weight of Aronix M210 and 1 part by weight of Irgacure 907. The refractive index of the second photocurable resin 6 is larger than that of the first photocurable resin 2, i.e., the clad layer 5.

Figure 6:
FIG. 6 is a sectional view showing a state wherein light is radiated to the photocurable resin charged into the grooves of the optical waveguide pattern through the reinforcing member to form cores.
Figure 5:
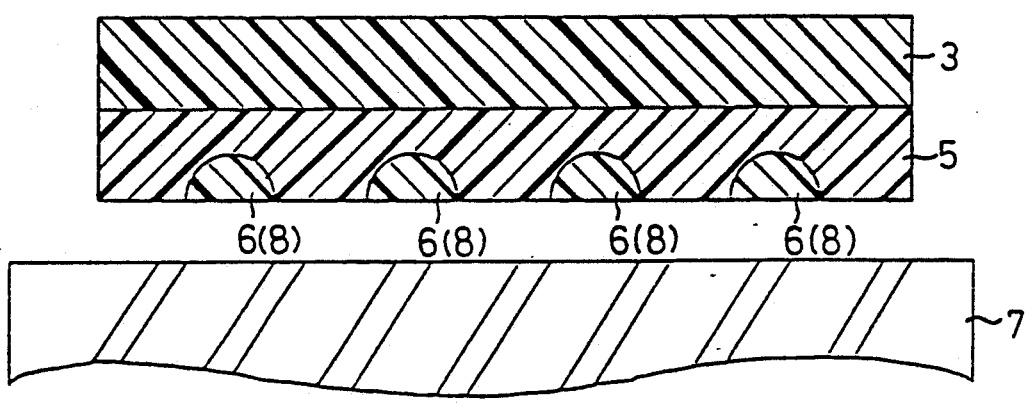

Then, as shown in FIG. 6, above a nitrogen evolving portion 7, the reinforcing member 3 is turned upward and nitrogen is sprayed toward the clad layer 5 filled with the second photocurable resin 6 to replace the atmospheric gases, to include oxygen, next to the surface of clad layer 5. In FIG. 6, the first reinforcing member 3, clad layer 5 and second photocurable resin 6 are illustrated in section along line VI-VI in FIG. 5. The second photocurable resin 6 is difficult to cure in an oxygen-containing atmosphere, so nitrogen is sprayed from the nitrogen evolving portion 7 toward the clad layer 5 filled with the second photocurable resin 6 to create an oxygen-free atmosphere around the second photocurable resin 6. The gas for spraying toward the clad layer 5 is not limited to nitrogen. Other inert gases are also employable such as He (helium), Ne (neon), Ar (argon), Kr (krypton), Xe (xenon) and Rn (radon). When nitrogen is sprayed from the nitrogen evolving portion 7 toward the clad layer 5 filled with the second photocurable resin 6, the mercury vapor lamp 4 disposed above the reinforcing member 3 is turned ON. Since the reinforcing member 3 has a light transmitting characteristic as mentioned above, the UV light from the mercury vapor lamp 4 passes through the reinforcing member 3, it then further passes through the clad layer 5 and is applied to the second photocurable resin 6, whereby the second photocurable resin 6 is cured to form cores 8. Thus, the cores 8 are formed in the waveguide pattern grooves of the clad layer 5.

Figure 7:
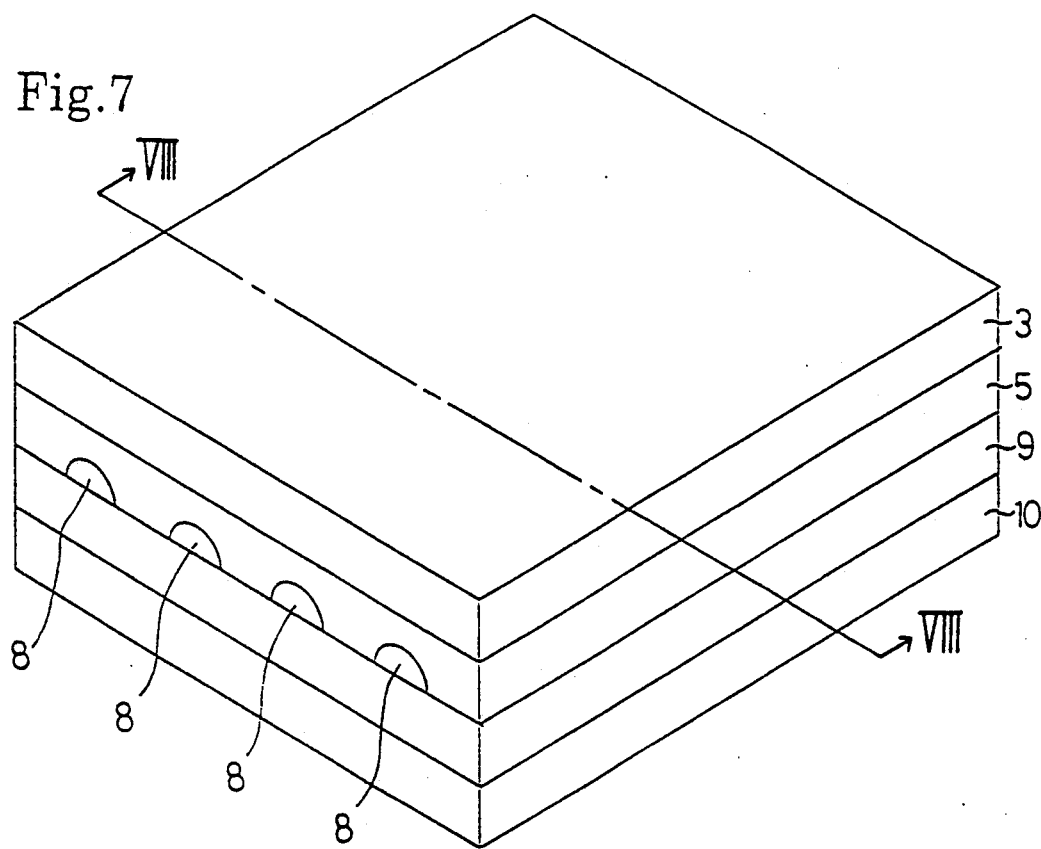
FIG. 7 is a perspective view showing a state wherein a photocurable resin has been applied onto another reinforcing member and onto the photocurable resin have been laminated the foregoing clad layer and reinforcing member.

Next, as shown in FIG. 7, a third photocurable resin 9, for the formation of a second clad layer, is applied to the clad layer 5, now having the cores 8, and a reinforcing member 10 is brought into close contact with the third photocurable resin 9. This reinforcing member 10 is a flat plate formed using a resin through which it is difficult to transmit a light as mentioned above.

Then, as shown in FIG. 8, the mercury vapor lamp 4 disposed above the first reinforcing member 3 is turned ON to radiate UV light to the first reinforcing member 3. FIG. 8 is a sectional view taken on line VIII-VIII in FIG. 7. Since the first reinforcing member 3 has a light transmitting characteristic as noted previously, the UV light radiated to the first reinforcing member 3 passes through the first reinforcing member 3, the clad layer 5 and the cores 8 and is directed to the third photocurable resin 9, whereby the third photocurable resin 9 is cured to form a clad layer 11. At the same time, the reinforcing member 10 is bonded firmly to the clad layer 11. In this way an optical waveguide array is formed.

The bulk loss of the optical waveguide array formed by this manufacturing method was −0.05 dB/cm (decibel per centimeter).

The present invention is not limited to the embodiment described above in detail. Various modifications may be made without departing from the scope of the invention.

Figure 9:
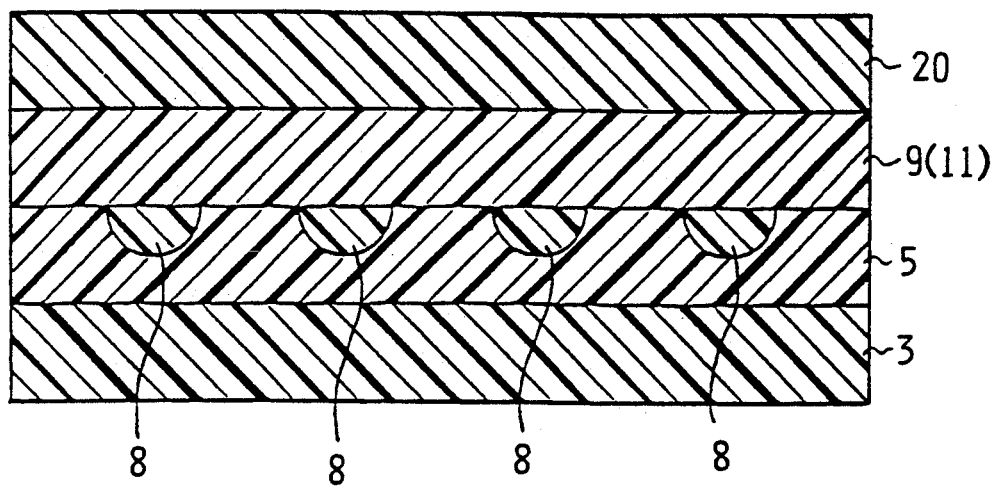
FIG. 9 is a sectional view of a second method of forming an optical waveguide.

For example, in the optical waveguide array manufacturing method of this embodiment, the reinforcing member 10 is a flat plate formed of a resin through which it is difficult to transmit a light of the wavelength necessary for the curing of a photocurable resin such as an acrylic resin, a polycarbonate resin or a polystyrene resin, like conventional reinforcing plates. However, the reinforcing member 10 may be a molded plate of TPX, or another material having similar light transmission characteristics, like the first reinforcing member 3, for example, by replacing plate 10 with plate 20 of FIG. 9. Thus, when the photocurable resin 9 is to be cured, UV light may be radiated from the reinforcing member 20 side. By so doing, unlike the above embodiment, the UV light will not pass through the clad layer 5 and cores 8 until it reaches the photocurable resin 9, and so the layer of the photocurable resin 9 can be formed on the clad layer more rapidly and efficiently.

Although the optical waveguide array of the above embodiment has only four optical waveguides, it goes without saying that the number of optical waveguides can be increased as desired by increasing the number of optical waveguide patterns of the mold 1.

As set forth above, the optical waveguide array of the present invention is characterized in that a clad portion which covers the cores is sandwiched between two reinforcing members, at least one of which has a light transmitting characteristic. Therefore, the photocurable resin layers cure quickly and the bonding between the clad layer and the reinforcing members is assured and strong, thus providing high reliability without deterioration of performance.

In the optical waveguide array manufacturing method of the present invention, moreover, since nitrogen is introduced as the atmosphere around the cores 8, it is possible to avoid the presence of oxygen during bonding and assembly of the constituent members, so that the bonding can be effected more quickly and efficiently, providing a higher yield and a more efficient mass-production.

What is claimed is:

1. An optical waveguide array comprising:
   a clad portion comprising a first layer and a second layer, said first layer having a plurality of grooves therein;
   a core formed in each of said plurality of grooves in said first layer of said clad portion; and
   two reinforcing members sandwiching said clad portion, at least one of said reinforcing members having a light transmitting characteristic, wherein said first and second layers of said clad portion comprise a first photocurable resin and said cores comprise a second photocurable resin.

2. An optical waveguide array according to claim 1, wherein said clad layers are formed by curing said first photocurable resin and said cores are formed by curing said second photocurable resin using ultraviolet light.

3. An optical waveguide array according to claim 1, wherein both of said reinforcing members have a light transmitting characteristic.

4. An optical waveguide array according to claim 1, wherein said reinforcing member having a light transmitting characteristic is a flat plate.

5. An optical waveguide array according to claim 3, wherein the light transmitting characteristic of said at least one of said reinforcing members is for transmitting ultraviolet light.

6. An optical waveguide array according to claim 1, wherein said reinforcing member having a light transmitting characteristic is made of polymethylpentene.

7. An optical waveguide array according to claim 1, wherein each said core has a cross section corresponding to a segment of a circle.

8. A method of manufacturing an optical waveguide array, comprising the steps of:
   applying a first photocurable resin to a mold having an optical waveguide pattern of the optical waveguide array;
   placing a first reinforcing member having a light transmitting characteristic on the upper surface of said photocurable resin and then radiating light from above said first reinforcing member to form a clad layer having grooves corresponding to the optical waveguide pattern, said clad layer being bonded firmly to the first reinforcing member;
   pouring a second photocurable resin having a refractive index higher than that of the first photocurable resin into the grooves of the clad layer;
   radiating light from above the first reinforcing member to cure the second photocurable resin to thereby form cores;
   applying a third photocurable resin having a refractive index lower than that of the second photocurable resin onto the core-formed surface of the clad layer and then placing a second reinforcing member on the third photocurable resin; and
   radiating light from above the first reinforcing member to cure the third photocurable resin applied to the core-formed surface of the clad layer to thereby form a photocured resin layer and bond the second reinforcing member firmly to said third photocured resin layer.

9. A manufacturing method according to claim 8, wherein the step of radiating light from above the first reinforcing member to cure the second photocurable resin to thereby form cores is carried out while spraying inert gas toward the second photocurable resin.

10. A manufacturing method according to claim 8, wherein said first reinforcing member having a light transmitting characteristic is a flat plate formed of polymethylpentene.

11. A manufacturing method according to claim 8, wherein said second reinforcing member also has a light transmitting characteristic.

12. A manufacturing method according to claim 11, wherein said second reinforcing member having a light transmitting characteristic is also a flat plate formed of a polymethylpentene.

13. A manufacturing method according to claim 8, wherein the steps of radiating light comprise radiating ultraviolet light.

14. A manufacturing method of claim 11, wherein said second radiating light step is modified to radiate light from above the second reinforcing member to cure the third photocurable resin applied to the core-formed surface of the clad layer to thereby form a photocured resin layer and bond the second reinforcing member to said third photocured resin layer.

15. A method of manufacturing an optical waveguide array, comprising the steps of:

applying a first photocurable resin to a mold having an optical waveguide pattern of the optical waveguide array;

placing a first reinforcing member having a light transmitting characteristic on the upper surface of said photocurable resin and then radiating light from above said first reinforcing member to form a clad layer having grooves corresponding to the optical waveguide pattern, said clad layer being bonded firmly to the first reinforcing member;

pouring a second photocurable resin having a refractive index higher than that of the first photocurable resin into the grooves of the clad layer;

radiating light from above the first reinforcing member to cure the second photocurable resin to thereby form cores;

applying a third photocurable resin having a refractive index lower than that of the second photocurable resin onto the core-formed surface of the clad layer and then placing a second reinforcing member having a light transmitting characteristic on the third photocurable resin; and radiating light from above the second reinforcing member to cure the third photocurable resin applied to the core-formed surface of the clad layer to thereby form a photocured resin layer and bond the second reinforcing member firmly to said third photocured resin layer.

16. A manufacturing method according to claim 15, wherein the step of radiating light from above the first reinforcing member to cure the second photocurable resin to thereby form cores is carried out while spraying inert gas toward the second photocurable resin.

17. A manufacturing method according to claim 15, wherein said first reinforcing member having a light transmitting characteristic is a flat plate formed of polymethylpentene.

18. A manufacturing method according to claim 15, wherein said second reinforcing member having a light transmitting characteristic is also a flat plate formed of polymethylpentene.

19. A manufacturing method according to claim 8, wherein the steps of radiating light comprise radiating ultraviolet light.

* * * * *